United States Patent [19]
Michel-Kim

[11] Patent Number: 5,026,403
[45] Date of Patent: Jun. 25, 1991

[54] THREE STAGE PROCESS FOR PRODUCING PRODUCER GAS FROM COMBUSTIBLE WASTE PRODUCTS

[76] Inventor: Herwig Michel-Kim, Bamberger Strasse 41, D - 1000 Berlin 30, Fed. Rep. of Germany

[21] Appl. No.: 319,264

[22] Filed: May 10, 1988

Related U.S. Application Data

[60] Continuation-in-part of Ser. No. 918,461, Oct. 14, 1986, abandoned, which is a division of Ser. No. 655,062, Sep. 26, 1984, abandoned.

[30] Foreign Application Priority Data

Sep. 28, 1983 [DE] Fed. Rep. of Germany ....... 3335544

[51] Int. Cl.$^5$ .............................................. C10J 3/06
[52] U.S. Cl. ........................................ 48/203; 48/209
[58] Field of Search ............... 48/203, 209, 197 R, 48/210; 201/2.5, 25, 27, 29, 36

[56] References Cited

U.S. PATENT DOCUMENTS

| 927,418 | 7/1909 | Loomis et al. | 48/209 |
| 2,805,188 | 9/1957 | Josenhans | 48/210 |
| 4,082,520 | 4/1978 | Baron et al. | 48/197 R |
| 4,153,426 | 5/1979 | Wintrell | 48/197 R |

Primary Examiner—Joye L. Woodard
Attorney, Agent, or Firm—Morgan & Finnegan

[57] ABSTRACT

A three stage process for producing producer gas from biomass or other carbonizable waste products using a double gasifier is described. A reactor for the three stage process comprising a primary, an intermediate and secondary gasifier is also described. The primary gasifier utilizes a vertically adjustable fill level sieve and a discharge mechanism for the combustion residues. The primary fuel and the preheated primary air are supplied to the primary gasifier via the reactor base. The secondary gasifier, a coke producer is connected to the primary gasifier downstream. The intermediate gasifier, a fluw flow gas converter, is supplied with secondary air. The low temperature carbonized gas from the primary gasifier, as well as the carbon particles leaving the primary gasifier are introduced into the secondary gasifier through a radially symmetrical ring nozzle to provide a long residence time under reducing conditions. The reactor is also optionally provided with one other gas, comprising at least in part the product, producer gas, introduced via a bypass arrangement.

10 Claims, 5 Drawing Sheets

THREE STAGE PROCESS FOR PRODUCING PRODUCER GAS FROM COMBUSTIBLE WASTE PRODUCTS

CROSS REFERENCE TO RELATED APPLICATION

This is a continuation-in-part application of co-pending application Ser. No. 918,461, which is a divisional application of application Ser. No. 655,062 filed Sept. 26, 1984, both of which are now abandoned.

BACKGROUND OF THE INVENTION

This invention relates to a three stage process for producing producer gas from biomass. Producer gas is a combustible mixture of nitrogen, carbon monoxide, carbon dioxide, hydrogen and methane. There are several known methods of obtaining producer gas.

The easiest way to gasify biomass is to charge fuelwood into a generator from the top and insert the air for gasification from the bottom (updraft). Air and fuel react in a countercurrent process. The thus obtained producer gas contains a lot of tar, phenols, acids, so that the purification is complicated and waste water management is very costly. To solve the waste water treatment, gasifiers were proposed where fuel and air is charged from the top (down draft gasification) and fuel and air flow in a concurrent manner. The gas is drafted from the bottom. But this type of gasifier needs dried hard wood with definite edge lengths to achieve satisfactory results. Therefore, most of the available wood wastes products cannot be gasified. Furthermore, scaling up is difficult and the purity of the gas is not ensured.

Approximately, in the last century a combination of an updraft gasifier and a second coke gasifier was proposed, in order to crack the tars, phenols, acids, and to improve the conversion of carbon dioxide to carbon monoxide and equalize the gas quality. But the demand for coke was rather high and the process control unsatisfactory.

In U.S. Pat. No. 927 418, B. Loomis and H. Pettibone disclose a process of manufacturing gas from wood by integrating a wood gasifier and a coke gasifier for a downdraft flow. Two gasifiers are connected at the top by a pipe in parallel. A layer of coke is placed above a grate and a layer of wood is placed over the coke. Wood is charged to the reactor on top of the coke beds and burned. Air is drawn up or down into the wood to cause its combustion. The wood ashes eventually plug the interstices in the body of coke and the coke must be cleaned by steam under pressure to keep it in good condition. Periodically the coke must be completely removed from the reactor in order to clean out the wood ashes. According to Loomis and Pettibone a good gas can be obtained but no detailed results on the tar and phenol content in the gas are disclosed. The process conditions are not stable because they change in proportion to the amount of wood being charged and the amount of air being drawn into the reactor. The temperature of the cracking or burning process cannot be controlled to the necessary temperature range and the residence time is not high enough for total gas reforming. The quality of the gas, therefore, varies and the tar and phenol content of the gas is likely to be quite high. Furthermore, the known process of manufacturing gas is a batch process have the following disadvantages: the process is unstable and unpredictable there is rapid consumption of coke, difficulty in replenishing the supply of coke to the reactor, and the requirement of cleaning the reactor.

During the past ten years biomass gasification in fluidized beds were tested but the results were not satisfying due to small fuel content in the fluidized bed and a low efficiency of gasification. The fuel must be very dry and only some kinds of biomass can be used. On the basis of today's calculation feasibility can only be expected for gasifiers with a performance higher than 10 MW.

As prior art, reference is also made to the so-called Reichelt purge gas process (German Patents 666,387, 712,290 and 744,135), as well as to the SIFIC process (German Patent 763,915). According to the two aforementioned processes, carbonization takes place in retorts, which are continuously or discontinuously charged with biomass. The extraction products of interest here are the condensable constituents of the organic vapors. The heat required for producing the carbonization gas is obtained by burning at least part of the residual gas.

Finally, reference is also made to the Kiener process, in which a coke gasifier is connected downstream of a low temperature carbonization gasifier and a particularly advantageous power utilization is achieved in that the producer gas is used for operating the gas motors, while the low temperature carbonization gasification takes place by means of the motor exhaust gases in a carbonization drum. As a result of the closed system, the process operates in a manner which is not prejudicial or harmful to the environment, because, except for the condensate water obtained, all the toxic compounds formed, such as, e.g., heavy metal compounds, are left behind in the low temperature carbonization coke. However, it is a disadvantage of this process that the carbonization drum is heated from the outside. Another disadvantage of this process is the interlinked insensitive and time-consuming dependence between the charging of the reactor on the one hand and the gas requirement on the other.

Therefore, it is on object of this invention to provide a process for producing producer gas from almost all biomasses which has stable and predictable process reaction conditions with a high efficiency resulting in a gas of good quality which is free from tars and phenols. Other objects will become clear throughout the course of the description provided below.

SUMMARY OF THE INVENTION

The process of the invention uses a three stage gasifier. The first stage is an underfeed concurrent flow primary reactor for the production of primary gas, the second stage is an intermediate gasifier or gas-cracker for cracking tar and phenols, and the third stage is a coke reactor. It is now possible using the inventive process to get a tar- and phenol-free producer gas from almost all biomasses. The gas can be utilized in furnaces and for chemical process as well as for driving gas engines or turbines.

The technical advantages of the three stage process and the three stage gasifier derive from the systematic segmentation of the gasification process and an optimization of the individual stages. The process parameters are controlled electronically.

The first stage using the primary reactor operates in a concurrent process of fuel and preheated air. In contrast to conventional gasification processes the fuel is charged continuously from the bottom into the primary reactor by means of an underfeeding device, e.g. the primary air is supplied at the reactor bottom through a ring nozzle and the fuel is charged from the bottom continuously in relation to the fuel consumption of the gasification process.

Similar to common concurrent gasifiers gasification takes place first in an oxidation zone and then in a reduction zone. In the oxidation zone, pyrolysis gas is combusted and charcoal produced. In the reduction zone the combustion gas and the glowing charcoal react together forming the primary gas. The resulting primary gas contains only small quantities of tar and phenol and can be used for burning purposes but is not clean enough when using it for gas engines.

The fuel level inside the primary reactor is measured from above by a separate level grate. The primary gasifier is charged proportionallY as a function of the fuel level. Additionally, charging can be modified depending on the rate of gas flow and the temperature of the primary gas.

The primary gas which leaves the primary gasifier at a temperature of approximately 650° C. is reformed at a temperature of approximately 900° C. (850° C. to 1000° C.) in the intermediate gasifier or gas cracker by addition of preheated secondary air. The amount of the preheated air in relation to the primary gas is regulated by a valve which is controlled electronically as a function of the temperature of cracking process so that process temperature is stabilized within a range of about 20° C. The relation between secondary air and primary air lies in the range of 15 to 35%. Usually, less than 10% of the primary gas is burned in the gas cracker. The primary gas is cracked within 0.5 seconds so that the tar and phenol is completely removed. Due to the hydrogen content of more than 15% in this intermediate gasification process PCB's cannot be formed. Therefore, even wastes with modest chlorine content can be gasified.

The primary gas contains up to 50 grams charcoal particles per $m^3$ gas. The particles improve the intermediate gasification process thereby minimizing the demand for secondary coke and optimizing the gas quality. The gas leaving the second stage can be used for motors but the heating value of the gas is not optimal and when the fuel is rather humid the cracking of tar and phenols is not totally ensured.

The gas cracker is ideal for cracking pyrolysis gases from separate pyrolysis units. Therefore, the intermediate gasifier can be combined with a pyrolysis module using a by-pass-system to the gas producer.

The third stage, the coke reactor, operates in a concurrent flow of gas and fuel. It is designed for using coke as well as for charcoal. The coke reactor functions as a safety device ("glowing filter") which decomposes tar and phenol left over from the first two stages. Additionally, the heating value of the producer gas is increased and equalized by reduction processes between steam, carbon dioxide and coke. The coke consumption of the coke reactor depends on the humidity of the primary fuels and lies between 1 and 5% of the total fuel consumption. By optimizing the continuous process of the primary gasification and a steady intermediate gasification, the coke demand and the deviations of the gas quality are minimized.

A heavy duty exchanger is integrated into the coke reactor for preheating the gasification air up to 600° C. and cooling the producer gas to 450° C. The remaining heat of the gas can be utilized for drying the fuel wood. The preheating of the gasification air ensures a very high level of efficiency of the gasification process.

The by-pass-system, in various advantageous embodiments, is particularly desirable because carbonization or evaporation can be controlled with a short delay time by the operationally dependent vacuum or induced draught in the primary gasifier.

The varying of the vacuum by means of a pressure reducer ensures a modification in the by-pass gas. Fluctuations during the evaporation or carbonization can be easily compensated for by the primary gasifier operation.

The invention is described in greater detail hereinafter relative to non-limitation embodiments and the attached drawings.

DETAILED DESCRIPTION OF THE PREFERRED EMBODIMENTS

Figure 1:
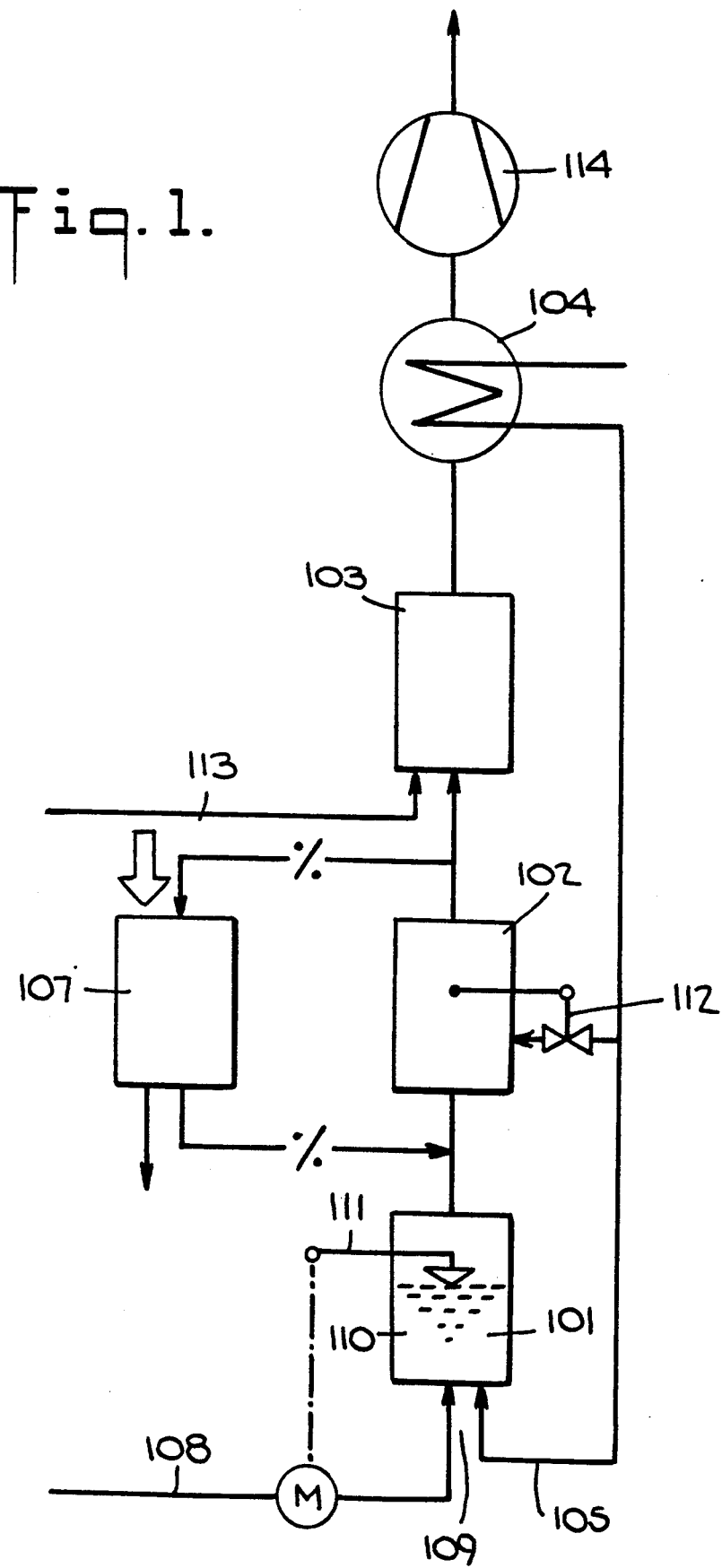
FIG. 1 represents a flow sheet of the total process according to the invention.
Figure 2:
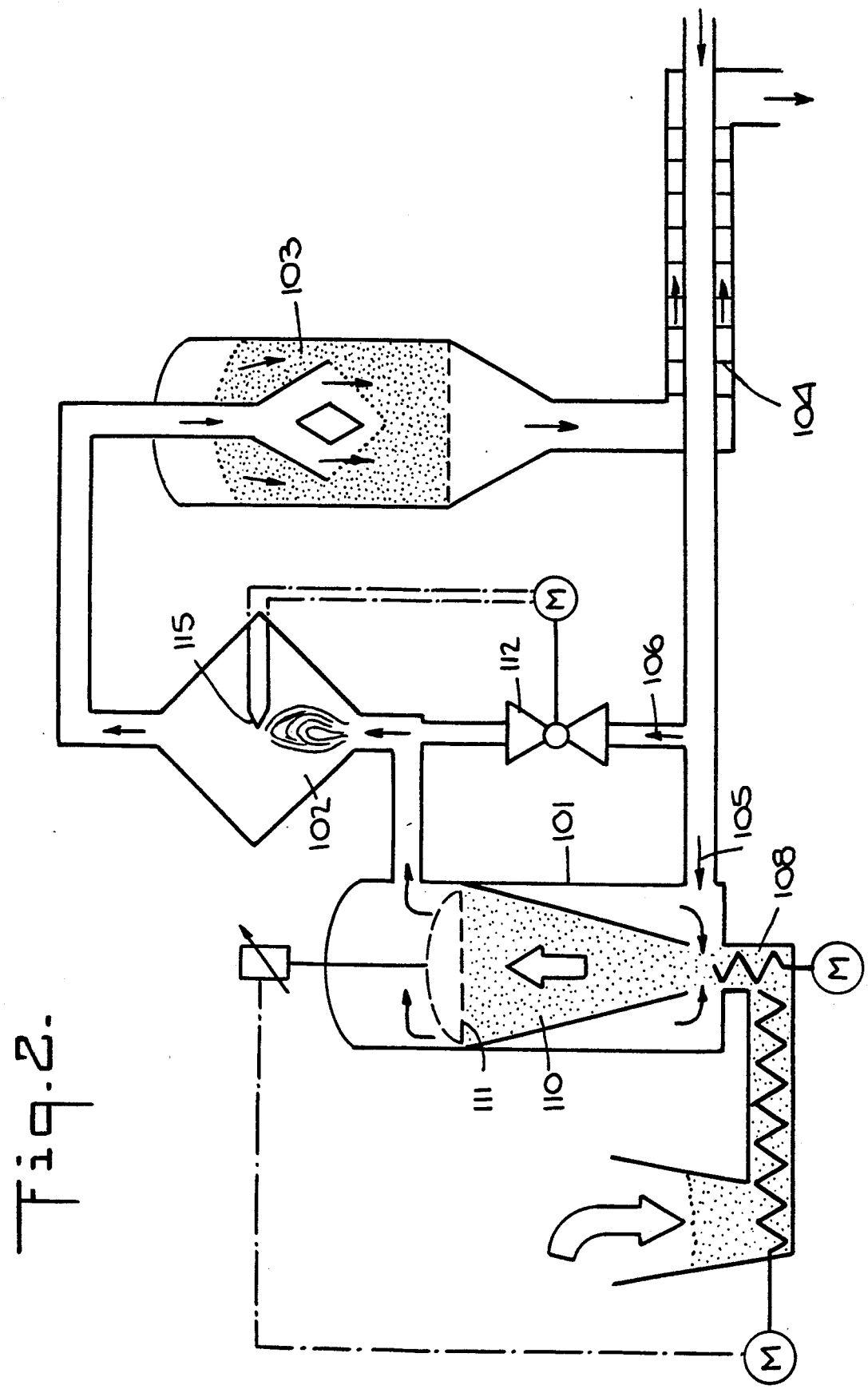
FIG. 2 represents the schematic arrangement of the apparatus carrying out the inventive process.

FIG. 1 shows a flow chart of the total process, and FIG. 2 the schematic arrangement of the apparatus carrying out the inventive process. In FIG. 1, a primary underfeed gasifier 101 is followed by an intermediate gasifier 102, a coke gasifier 103, a heat exchanger 104 for preheating the primary air 105 and the secondary air 106. Optionally, a by-pass pyrolysis unit 107 can be operated parallel to the intermediate gasifier 102 or parallel to the combination of the intermediate gasifier 102 and the coke gasifier 103, utilizing the hot producer gas being reformed in the intermediate gasifier and recycling a mixture of producer gas and pyrolysis gas from the bypass pyrolysis 107 to the inlet of the intermediate gasifier 102.

The fuel is charged continuously to the primary gasifier 101 by means of an underfeeding device 108. This reactor operates in a concurrent flow process of fuel and preheated primary air as indicated by the parallel arrows 109 of the air and fuel flow in FIG. 1. The level of the primary gasifier bed 110 is controlled by a level grate 111 and in relation to the level the speed of the charging is modified. When the level decreases the speed increases and vice versa. Additionally, the charging of the primary gasifier 101 can be controlled to depend on the temperature in the primary gasifier, i.e. the temperature of the primary gas. Together with the primary gas leaving the primary gasifier 101 carbon or charcoal particle are entrained due to the centrifugal movement of the gas and the mixture is supplied to the intermediate gasifier 102. The carbon particles improve the reduction process in the intermediate gasifier 102.

The intermediate gasifier 102 operates as a combustion chamber into which preheated secondary air 106 is introduced. However, the temperature in the intermediate gasifier 102 is stabilized by an electronically controlled valve 112 which controls the amount of the introduced secondary air 106. The temperature of the cracking process in the intermediate gasifier 102 is measured by means of a temperature sensor 115. Only a small portion of the primary gas is burned and in the reformed gas remains a high surplus of hydrogen and carbon monoxide so that no oxidizing atmosphere exists.

The coke gasifier 103 is also operated in a concurrent flow process as indicated in FIG. 1 by the parallel arrows of the intermediate gas and the added coke 113.

Advantageously, the producer gas is drawn off the coke gasifier 103 by means of a suction blower 114 and supplied to the gas air heat exchanger 104 which works in a countercurrent flow. The rate of the producer gas flow depends on the power of the suction blower 114 and thus the underpressure in the three stages is dependent on the drawn off producer gas. Therefore, the pressure can be controlled as a function of the producer gas consumption, i.e. the rate of producer gas flow.

The pyrolysis unit 107 can be used for pyrolyzing wood, oils, waste of various types and so on. The generated pyrolysis gases are conveyed into the intermediate gasifier 102.

Figure 3:
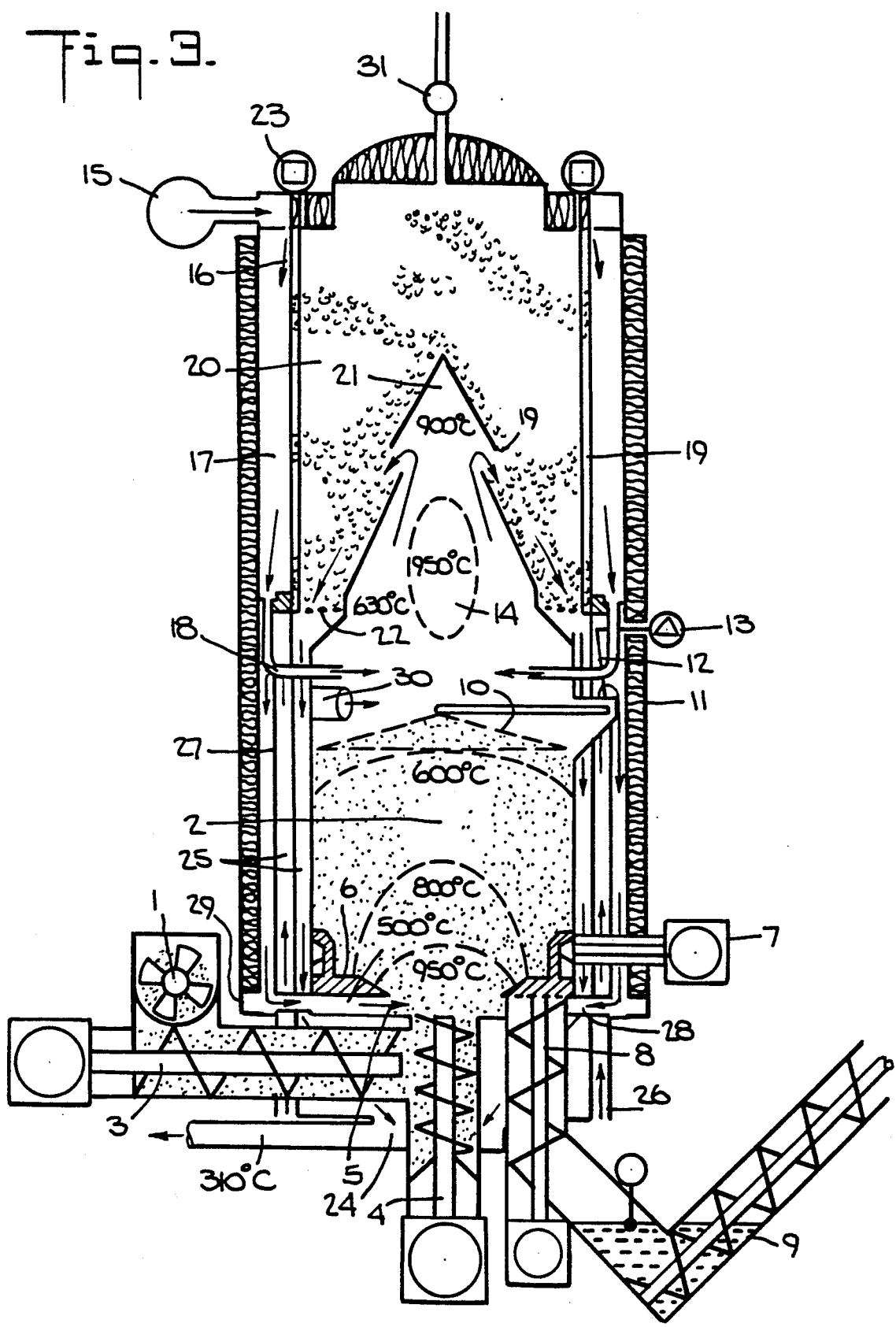
FIG. 3 represents a longitudinal section through a reactor where all the three stages are integrated within one apparatus.

FIG. 3 diagrammatically shows a reactor in longitudinal section where the three stages, primary gasifier, intermediate gasifier, and coke reactor as secondary gasifier, are integrated within one apparatus. FIG. 3 shows an upright cylindrical reactor vessel, whose lower part houses the primary gasifier 2, whilst the upper area defines the secondary gasifier 20. The inner space between the primary gasifier and secondary gassifiers show as intermediate gasifier a flue flow gas converter 14 located between a fill level sieve 10 of primary gasifier 2 and a circular grate 22 of secondary gasifier 20.

From the bottom of the reactor primary gasifier 2 is centrally supplied with the form of a biomass or other carbonizable waste products. For this purpose, the primary fuel passes from storage (which is not shown in FIG. 3), via a dosing screw 1 into a horizontal impact screw 3. Horizontal impact screw 3 opens perpendicularly into a vertical impact screw 4, through which fuel is introduced in clog-free manner proportional to the oxidizing or melting loss in the primary gasifier 2.

The primary air for operating primary reactor 2 is drawn in via an annular channel 26 positioned below the reactor base. From there the primary air is fed into a countercurrent heat exchange 25. Thus, from annular channel 26, the primary air flows into the countercurrent heat exchanger 25, which is arranged as a central annular ring between an inner annular ring and an outer annular ring in the reactor jacket, essentially in the vicinity of primary gasifier 2. The inner annular channel or ring is separated by a wall from the central annular ring and by means thereof, a high proportion of the heat of the gas leaving the secondary gasifier through the inner annular ring is transferred to the drawn-in primary air. The primary air which has been heated countercurrently, roughly level with nozzles 18 which supply secondary air into the reactor, is deflected in the reactor jacket about the upper end of a separating or deflecting plate 27 (see FIG. 3). Relative to the gas flow of the secondary gasifier 20, the primary air is passed in parallel flow manner within an outer annular ring downwards toward the reactor base. A plurality of symmetrically arranged nozzles 28 supply the primary air to ring nozzle 5. Due to the special guidance within the reactor jacket, the primary air, heated to roughly 500° C., flows into the zone for feeding the biomass or the like into the primary gasifier 2. The reactor temperature in primary gasifier 2 is approximately 950° C. at this point. It is possible to heat up the primary air in another way as in FIG. 2, and to supply it directly into the base of the primary gasifier.

A rotary slide valve 6 is provided in the reactor base area for slag removal immediately above the central infeed of the primary fuel through vertical impact screws 4 and above the supply of the preheated primary air through ring nozzle 5. For example, the rotary slide valve 6 may be in the form of a circular grate movably mounted on the reactor side wall provided with a drive 7. It eccentrically overlaps a discharge screw 8 which passes through the reactor base. In the diagrammed embodiment, discharge screw 8 is vertical with respect to the reactor. The slag and similar incombustible constituents are supplied to a water sluice 9 through discharge screw 8. The removal of the incombustible constituents from the primary reactor can take place continuously or discontinuously. By means of a further upwardly conveying screw, the quenched slag is discharged from water sluice 9. The water level in sluice 9 can be controlled and, if desired, can be kept at a desired nominal level.

The charging of the primary gasifier 2 with primary fuel via the vertical impact screw 4 is monitored with regard to the primary gasifier fill level and is limited by a level sieve 10 mounted in vertically adjustable manner on the inner side wall of the reactor 11. A sensor 12 senses the actual height of sieve 10 and supplies this to an indicator and control device 13. Control device 13 operates the dosing screw 1 to supply the primary fuel on the basis of a comparison between the actual and desired values, i.e. the speed of the charging can be controlled. The level sieve 10 provides an upward limitation of the primary gasifier 2 and passes into the flue flow gas converter 14 as the intermediate gasifier for the primary gas flowing into it in a concurrent manner. The primary gas is heated to such an extent that tar and phenol fractions contained therein are removed within a highly reducing atmosphere. For the purposes of increased heat product within the intermediate gasifier 14, secondary air is supplied to it via a plurality of nozzles 18 issuing laterally out of the reactor wall. The secondary air flows in directly from an annular ring 17 arranged about the reactor jacket in the vicinity of the secondary gasifier 20 and is supplied to the upper reactor cover area by means of a dosing device 15. For this purpose, an annular clearance 16 links the intake via dosing device 15 with the annular ring 17. The dosing device 15 responds to the temperature controlled valve 112 of FIGS. 1, 2 and supplies the secondary air in an amount dependent on the temperature in the intermediate gasifier 14. In order to equalize the air supply, the secondary air is guided tangentially to the reactor jacket directly behind the dosing device 15 in annular clearance 16 and is homogeneously distributed through annular clearance 16 over the peripheral surface of the reactor jacket. Annular ring 17 is used for preheating the drawn-in secondary air. The secondary air is fed into the intermediate gasifier 14 via nozzles 18. This feeding takes place in such a way that the level sieve 10 is not overly heated and the residence time of the gas from the primary gasifier 2 is as long as possible. In each case the residence time is optimum for producing a gas with a low tar and phenol content prior to entering the secondary gasifier 20. For this purpose, circular grate 22 brings about an upward closure of the flue flow gas converter 14 with respect to the secondary gasifier 20. Circular grate 22 is constructed so that it tapers centrally upwards, i.e. is roughly conical thereby allowing optimal residence time. The tip 21 of ring nozzle 19 forms a retaining area for the gases and particles of all types which are upwardly entrained. The flow path via the radially symmetrical circular nozzle 19 within or towards the secondary gasifier 20 is deflected, in order to flow homogeneously through the coke bed of the secondary gasifier, which is also a coke reactor. The deflection of the gas via ring nozzle 19 extends the residence time of the heavier particles such as the upwardly accelerated carbon particles in tip 21 of the circular grate 22. This roughly proportionally increases the aforementioned increased residence time. The flue coal, which is made to glow at a temperature of approximately 950° C. in this area assists the desired reduction process.

The operation of the reactor of this invention also results in further cracking of the tar constituents and the other heavy fractions within secondary gasifier 20. The gas of primary gasifier 2 is deflected by the radially symmetrical ring nozzle 19 and undergoes further reduction in the coke bed of secondary gasifier 20. It passes at approximately 600° to 700° C. into the inner annular ring of the lower reactor section through the lower area of circular grate 22. The length of the necessary reduction zone can be optimized by vertical adjustment of grate 22 and can be adapted to the particular process conditions.

The coke charging of secondary gasifier 20 takes place continuously or discontinuously and in a manner known to those of skill in the art via the reactor cover. Homogenization of the coke distribution is ensured by vibrating means 23 and the reactivity of the coke gasifier can e.g. be improved by means known to those of skill in the art, e.g., by ultrasonic action. The gas travelling in parallel through the inner annular ring is removed from the reactor via a central suction device 24 in the base of the reactor. The high temperature of the gas flowing through the inner annular ring provides extensive protection to the primary gasifier 2 against heat losses to the outside and concurrently supplies approximately 40% of the heat via the intermediate wall to the aforementioned heat exchanger between the inner annular ring and the central annular ring used for preheating the primary air in the embodiment diagrammed in FIG. 3.

A useful feature of the operation of the intermediate gasifier 14 is that foreign gases of all types, e.g. pyrolysis gases, can be supplied thereto through one or more lateral foreign gas intakes 30. The adsorption action of the highly active fine coals which are entrained in the primary gas flow is used to remove harmful substances from the gas. The gas flows through said fine coals in a surge tank. If a scrubber is used for gas cleaning purposes, the flue coal produced can be used for cleaning purposes at the surface of the wash water.

Ring nozzles 5 are optically monitored through observation window 29 and can be cleaned if necessary. To ensure that the operating temperature of the reactor is maintained for as long as possible on ending the operation so as to prevent degassing though the air supply, a chimney with a dosing opening 31 for quiet operation is provided in the reactor cover. The natural warm air currents within the reactor ensure that both the primary air and the secondary air are sucked in adequate quantities via the aforementioned intake and that the gas escaping from the primary reactor and guided through the hot secondary reactor is free from dense smoke and can therefore be discharged in a manner not harmful or prejudicial to the environment.

Figure 4:
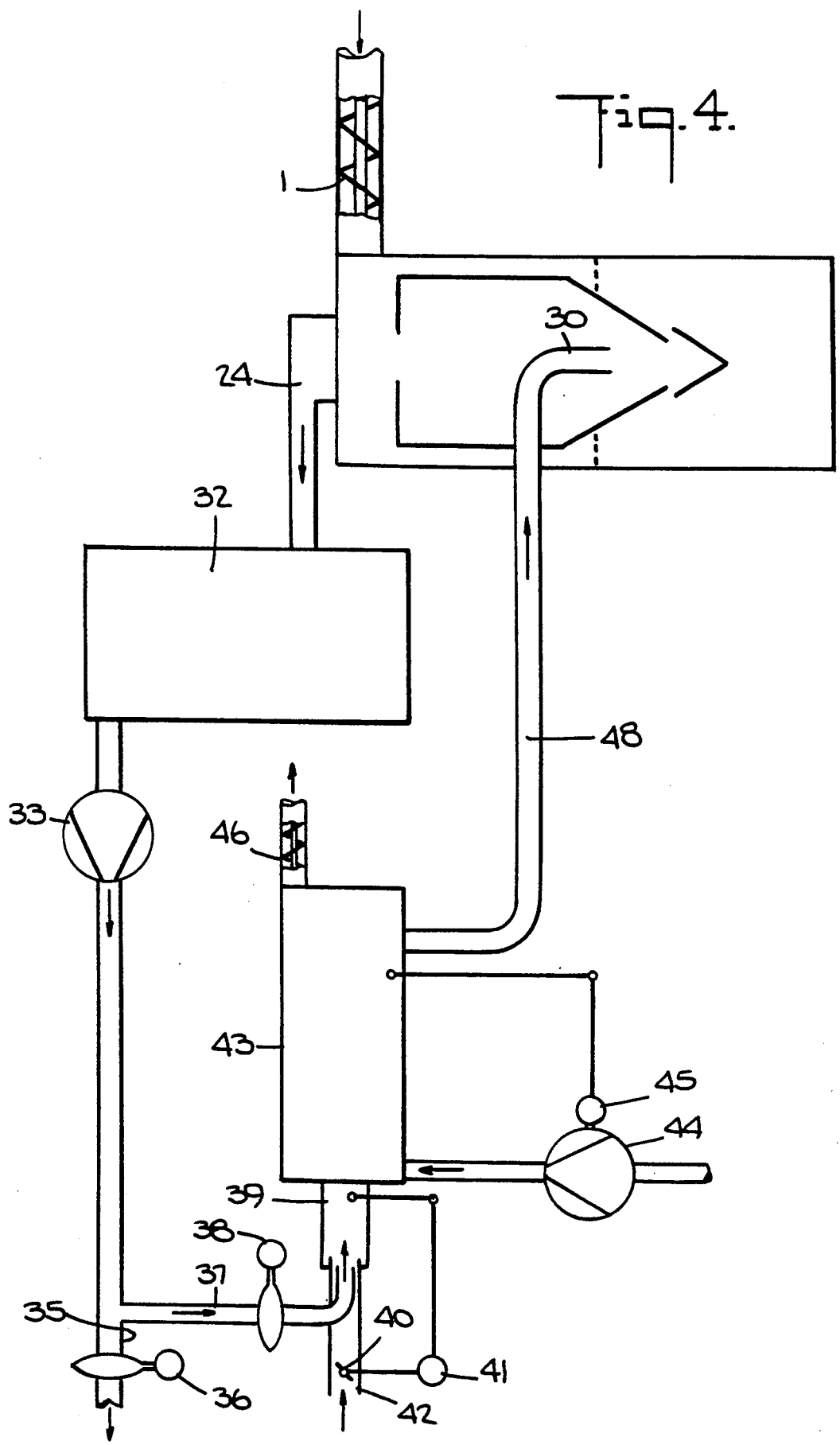
FIG. 4 represents an embodiment of a by-pass arrangement in conjunction with the reactor according to FIG. 2 or FIG. 3.
Figure 5:
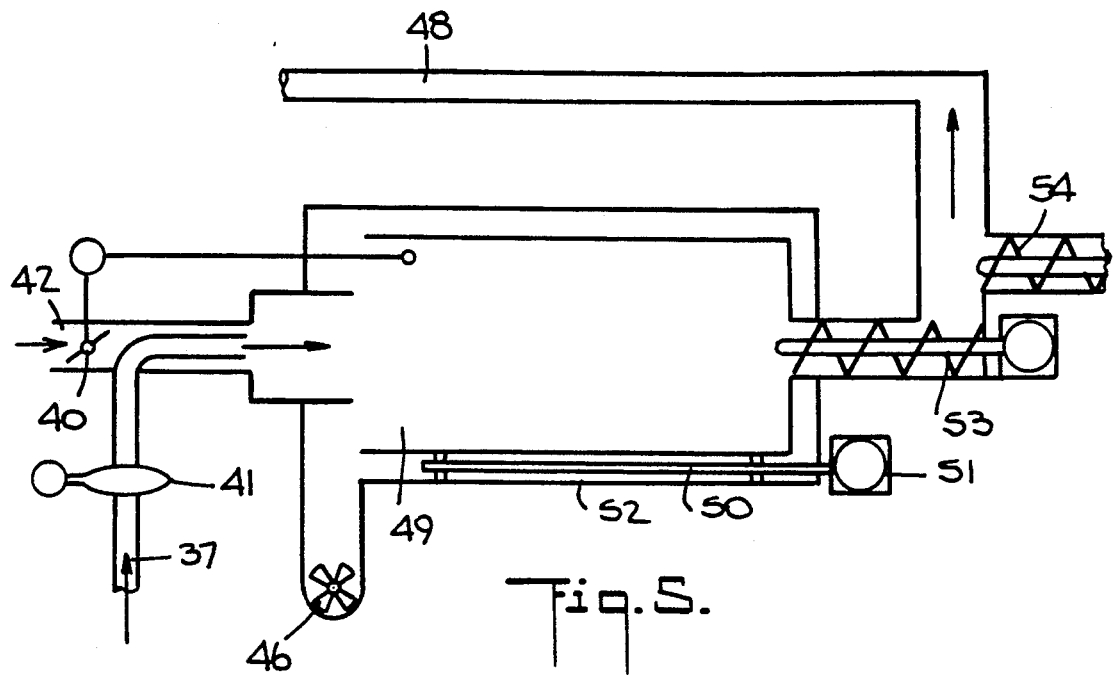
FIG. 5 represents another by-pass embodiment using a container.
Figure 6:
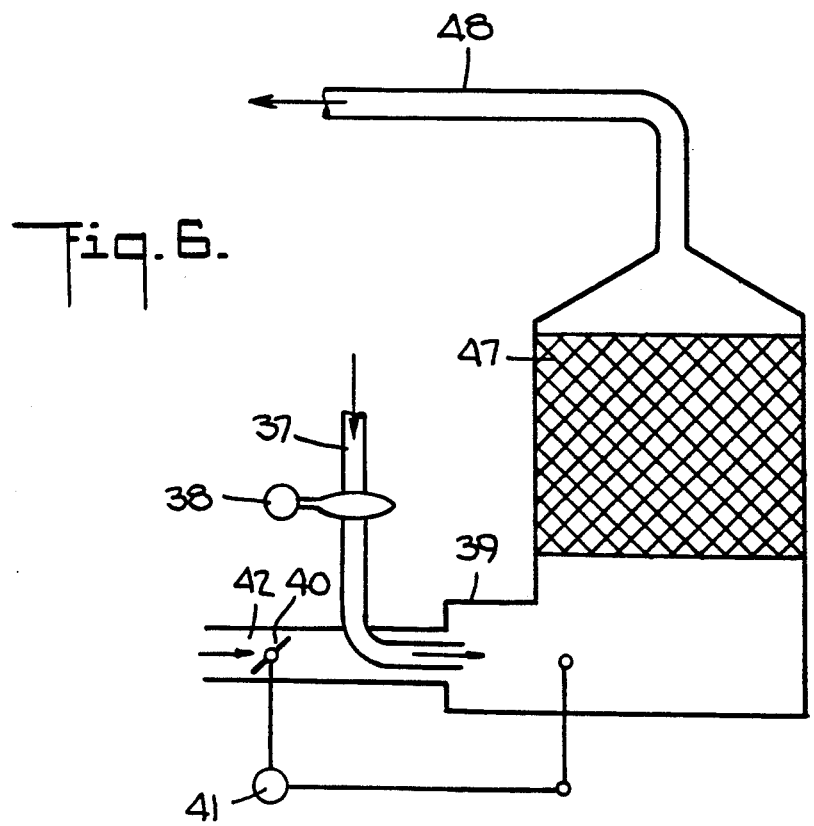
FIG. 6 represents another embodiment of a by-pass arrangement with a low temperature carbonization drum.

FIGS. 4 to 6 show different embodiments of bypass arrangements for the reactor according to this invention as shown in FIGS. 1 to 3.

According to FIG. 4, the producer gas taken from the reactor is supplied through a gas outlet 24 to a cleaning means 32. After cleaning therein, it passes through a blower 33 and a pipe 35 both to the bypass of pipe 37 and to a rando gas consumer through pressure regulator 36. The bypass flow which branches from pipe 37 passes into a combustion chamber 39, via a pressure reducer 38, which responds to vacuum. By means of a throttle flap 40 regulated in temperature-dependent manner and using a servomotor 41, sufficient air is supplied to bypass 37 dosed via the air intakes 42 in combustion chamber 39, that it is always possible to give a product-specific combustion temperature, whilst also ensuring that the low oxygen-reducing atmosphere for the inflowing gas is maintained. The carbonization gas brought to an elevated temperature in this way passes from combustion chamber 39 into a reaction chamber 43, in which the combustible components are contacted by means of a dosing device 44 and a temperature dependently reacting control element 45 such that the particular components used are evaporated and/or carbonized and the gases produced in this atmosphere can be supplied from reaction changer 43, across pipe 48 to the foreign gas supply 30 to the double gasifier. Thus, any harmful substance fraction can be guided in optimum manner in closed circuit form in the intermediate gasifier 14, 102, in such a way that the environment is not prejudiced. This is particularly significant when burning heavy metal-containing lubricating oils or the like. Any residual substances left behind in the reaction chamber 43 are removed therefrom at outlet 46.

Hereinafter, two more possible embodiments of the bypass arrangement are described.

In FIG. 6, the purified gas removed from the reactor is passed via bypass pipe 37 and pressure reducer 38 to a burner 39, which is associated with a regulated air supply, namely the throttle flap 40 with servomotor 41, and the air intake 42 in accordance with the bypass arrangement of FIG. 4. The heated gas flows through the sieve container 47 from below and the carbonization gases produced are drawn in via a pipe 48, together with the partly burned weak gas. They are then introduced via the foreign gas intake 30 into the intermediate gasifier 14. This is once again a closed circuit with actual and desired values for the particular parameters required.

A closed bypass is also obtained in the construction according to FIG. 5, using a low temperature carbonization drum 49, which is mounted in rotary manner by means of roller bearings 50 along its jacket 52, rotation taking place by means of drive 51. The material to be carbonized and present in drum 49 is supplied in countercurrent manner via a screw 53 and a dosing screw 54. The low temperature carbonization gases, together with the partly burned weak gas are supplied to the flue flow gas converter 14 by screw 53 and suction line 48 via the foreign gas intake 30. The carbonization residues are removed from drum 49 by means of a discharge mechanism 46.

I claim:

1. A process for producing producer gas from a combustible material comprising:
   a. supplying a primary gasifier with the combustible material and preheated primary air in a concurrent flow in relation to each other, controlling the supply of the combustible material to said primary gasifier as a function of the rate of consumption of the combustible material and reacting said combustible material and preheated air, thereby producing a primary gas including tar and phenol fractions;
   b. supplying the primary gas together with entrained carbon particles to an intermediate gasifier and mixing said primary gas with secondary air for the purposes of increased heat production within said intermediate gasifier, the amount of secondary air being fed to said intermediate gasifier by a plurality of nozzles as a function of the temperature in the intermediate gasifier;
   c. maintaining the mixture of primary gas, secondary air, and carbon particles, under reducing conditions in the intermediate gasifier, thereby cracking the tar and phenol fractions of the primary gas and producing a partially combusted producer gas containing carbon particles; and
   d. conveying the partially combusted producer gas containing carbon particles to a secondary gasifier which is a coke gasifier filled with highly reactive glowing coke, such that the residence time of the partially combusted gas is sufficiently long to reduce the partially combusted gas and to further crack the tar and phenol fraction of the partially combusted gas such that the gas exiting the secondary gasifier is a pure producer gas with high heating value.

2. Process according to claim 1 wherein the consumption of combustible material is measured by means of a level sieve.

3. Process according to claim 1 wherein the rate of combustion of the combustible material is controlled by the temperature in the primary gasifier.

4. Process according to claim 1 wherein the rate of consumption of the combustible material is controlled by the rate at which the producer gas is drawn off the secondary gasifer.

5. Process according to claim 1 wherein the secondary air is preheated and the rate at which it is supplied is such that the temperature in the intermediate gasifier is maintained between 850° C. and 1000° C.

6. Process according to claim 1 wherein the combustible material, preheated primary air, secondary air and the primary gas are supplied in concurrent flow relative to each other.

7. Process according to claim 1 wherein the primary air and secondary air are preheated by conveyance through a heat exchanger supplied with the producer gas leaving the secondary gasifier.

8. Process according to claim 1 wherein the secondary air entering the intermediate gasifier is supplied in a turbulent manner to the intermediate gasifier such that the residence time of carbon particles therein is increased.

9. Process according to claim 1 wherein the producer gas is drawn off the secondary gasifier by means of a sucking blower creating an underpressure which varies with the rate at which the producer gas is drawn off.

10. Process according to claim 1 wherein at least a part of the gas leaving the intermediate gasifier or the secondary gasifier is conveyed to a by-pass pyrolysis unit in which waste products containing hazardous materials are pyrolysed to a gas and reconveyed into the intermediate gasifier.

* * * * *